Patented Mar. 15, 1938

2,111,446

UNITED STATES PATENT OFFICE 2,111,446

CELLULOSE ACETOBUTYRATE LACQUERS

Walter E. Gloor, Wilmington, Del., assignor to Hercules Powder Company, Wilmington, Del., a corporation of Delaware No Drawing. Application November 16, 1934, Serial No. 753,304

4 Claims. (Cl. 134—79)

This invention relates to lacquers containing cellulose acetobutyrate.

Hitherto lacquers have generally been produced with nitrocellulose as a base. However, such lacquers have suffered from various disadvantages among which may be mentioned inflammability and discoloration on exposure to heat or light. It has accordingly been proposed to use certain organic esters of cellulose, principally cellulose acetate, as a base for lacquers. Cellulose acetate and other similar esters of cellulose, however, are not very suitable for use in lacquers, because of their incompatibility with most natural and, especially, with most synthetic resins, necessary ingredients of a lacquer satisfactory for general use. Thus, for example, cellulose acetate is incompatible with various polybasic acid-polyhydric alcohol resins, phenol-formaldehyde resins, vinyl acetate resins, etc., all of which are valuable types of lacquer resins, in the proportions necessary for the formulation of a satisfactory lacquer.

Now in accordance with this invention, it has been found that cellulose acetobutyrate, a mixed ester of cellulose, is compatible to a marked degree with various of the synthetic resins commonly used in nitrocellulose lacquers, although, as has been said, cellulose acetate and its homologues are incompatible with these resins. The term "synthetic resin" has heretofore been used somewhat loosely in the coating composition art, and it is felt advisable to define its meaning as used in this specification. The term "synthetic resin" is here used in its strict sense and refers to those resinous materials produced by synthesis from non-resinous materials or to resins derived therefrom in contrast to natural resins and those artificial resins which owe their resinous characteristics to the use of natural resins in their production.

Not all synthetic resins are compatible with cellulose acetobutyrate, since, of course, there are synthetic resins which are intended for use in molded articles and are insoluble and infusible, and there are others intended for use in varnishes and not suited for use in any type of lacquer. Most all of the synthetic resins utilizable in nitrocellulose lacquers, however, will be found to be compatible with cellulose acetobutyrate. The term "compatible" is defined as indicating that a lacquer containing over 3%, referred to the solids content, of resin is clear.

As examples of synthetic resins which are compatible with cellulose acetobutyrate the following may be mentioned by way of illustration:

Soluble polybasic acid-polyhydric alcohol resins either saturated or having a relatively low iodine value, as, for example, glycol phthalate, a mixed glycol-glyceryl phthalate, a glyceryl phthalate-glycol succinate resin, a glyceryl phthalate modified with a saturated dibasic acid, or with a saturated fatty acid, a glyceryl phthalate modified with a non-drying oil or with an unsaturated acid derived from a non-drying oil, etc.; the phthalic anhydride constituent of these resins being, of course, replaceable by any other dibasic acid.

Soluble polymerized vinyl acetate or ethyl acrylate resins, polyvinyl acetate acetals and methylals, etc.

The lacquers in accordance with this invention will accordingly comprise cellulose acetobutyrate, a compatible synthetic resin, and a solvent. Usually a plasticizer as, for example, dibutyl phthalate, triethyl citrate, tricresyl phosphate, etc., will be included, but the use of a plasticizer is not essential and may, in accordance with this invention, be omitted. Pigments, etc., may be added if desired. Any solvent, or mixture of solvents, having a solvent action on the ingredients, as, for example, acetone, ethylene dichloride, toluol, methyl cellosolve acetate, ethyl acetate, etc., may be used. The proportions of the various ingredients may be widely varied, depending upon the particular use for which the lacquer is intended, but in order to produce a homogeneous, hard, adhesive film from the lacquer the total amount of resin and plasticizer should not exceed about 75% of the solids in the lacquer, and the quantity of plasticizer should not exceed the amount of resin present.

The compositions illustrated below are typical of lacquers containing a polymerized vinyl acetate type synthetic resin. The compatibility of cellulose acetobutyrate with this class of resin permits the formulation of a wide variety of coating compositions, depending whether hard or soft grades of resin are used. Water-white coatings of great resistance to ultra-violet light are obtained through the use of these resins.

|  | A | B | C |
|---|---|---|---|
| Cellulose acetobutyrate | 6 | 6 | 6 |
| Poly-vinyl acetate resin M. P. 85° C | 7.5 |  |  |
| Poly-vinyl acetate resin M. P. 140° C |  | 6 | 6 |
| Dibutyl phthalate |  |  | 1.5 |
| Acetone | 25 | 25 | 25 |
| Ethyl acetate | 25 | 25 | 25 |
| Ethyl lactate | 10 | 10 | 10 |
| Methyl cellosolve acetate | 10 | 10 | 10 |
| Toluol | 16.5 | 18 | 16.5 |
| Pfund hardness | 56 |  | 61 |

Such lacquers are particularly adapted for use as clear metal lacquers on such things as light fixtures, etc.

It will be understood that the details and formulae hereinabove set forth are illustrative only, and that the invention as herein broadly described and claimed is in no way limited thereby.

What I claim and desire to protect by Letters Patent is:

1. A lacquer characterized by its capability of depositing a weather resistant, non-discoloring film, said lacquer comprising cellulose acetobutyrate, a polymerized vinyl acetate synthetic resin compatible therewith, and a solvent.

2. A lacquer characterized by its capability of depositing a weather resistant, non-discoloring film, said lacquer comprising cellulose acetobutyrate, a polymerized vinyl acetate synthetic resin, a plasticizer and a solvent, the plasticizer being present in amount not exceeding the amount of resin present and the resin and plasticizer together constituting less than 75% of the lacquer solids.

3. A lacquer characterized by its capability of depositing a weather resistant, non-discoloring, non-chalking film, said lacquer comprising cellulose acetobutyrate, a polymerized vinyl acetate synthetic resin compatible therewith, a plastizer, a pigment and a solvent.

4. A lacquer characterized by its capability of depositing a weather resistant, non-discoloring, non-chalking film, said lacquer comprising cellulose acetobutyrate, a polymerized vinyl acetate synthetic resin compatible therewith, a plasticizer, a pigment and a solvent, the plasticizer being present in amount not exceeding the resin present, and the resin and plasticizer together constituting less than 75% of the lacquer solids.

WALTER E. GLOOR.